United States Patent
Fukuda

(10) Patent No.: US 7,181,241 B2
(45) Date of Patent: Feb. 20, 2007

(54) MEMORY CARD, MEMORY CARD COMMUNICATION CONTROL METHOD, ELECTRONIC DEVICE, AND WIRELESS COMMUNICATION SYSTEM

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/167,959

(22) Filed: Jun. 28, 2005

(65) Prior Publication Data
US 2006/0019705 A1  Jan. 26, 2006

(30) Foreign Application Priority Data
Jul. 20, 2004  (JP) .............................. 2004-211189

(51) Int. Cl.
*H04M 1/00* (2006.01)
(52) U.S. Cl. .................................. 455/556.1; 455/550.1
(58) Field of Classification Search ................ 444/558, 444/426.2, 428, 41.2, 73, 83; 343/702, 876, 343/913, 884; 370/310, 350; 455/556.1, 455/550.1, 558
See application file for complete search history.

(56) References Cited
U.S. PATENT DOCUMENTS
6,405,278 B1  6/2002  Liepe

2002/0128052 A1 * 9/2002 Neagley et al. .............. 455/575
2002/0174337 A1 * 11/2002 Aihara ........................ 713/172
2004/0057455 A1 * 3/2004 Choi ............................ 370/463
2004/0198446 A1 * 10/2004 Liu et al. ..................... 455/558
2004/0266417 A1 * 12/2004 Janas .......................... 455/419
2006/0000914 A1 * 1/2006 Chen .......................... 235/492

FOREIGN PATENT DOCUMENTS

| EP | 0309201 | 3/1989 |
|----|---------|--------|
| JP | 2001077878 | 3/2001 |
| JP | 2004211189 | 7/2004 |
| WO | WO2004019261 | 3/2004 |

\* cited by examiner

*Primary Examiner*—Lester G. Kincaid
*Assistant Examiner*—Fred A. Casca
(74) *Attorney, Agent, or Firm*—Bell, Boyd & Lloyd LLP

(57) ABSTRACT

A memory card, memory card communication control method, electronic device, and wireless communication system are provided. The memory card can be used when inserted into an electronic device on which driver software cannot be installed, and can be inserted into an electronic device in the same manner as an existing memory card. Data is read from a flash memory in compliance with a data transmission request from a data reader. Upon receipt of a bit string of the data read from the flash memory, a signal processing section exercises on/off control over an antenna switch in accordance with the bit string, changes a load impedance of an antenna, generates a reflected wave by modulating an unmodulated carrier, which is transmitted to the antenna from the outside and uses the reflected wave to transmit the data to the data reader.

18 Claims, 4 Drawing Sheets

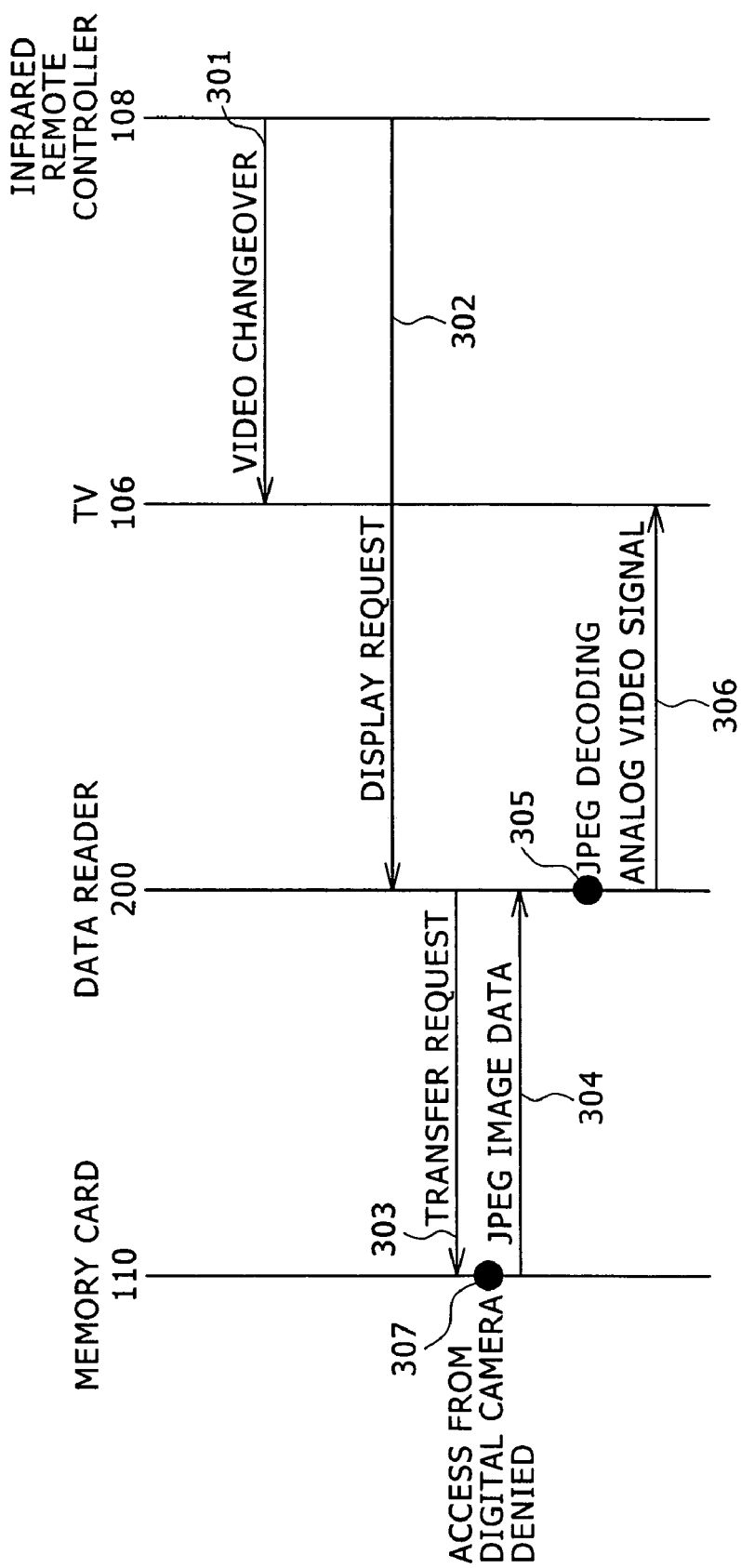

MEMORY CARD, MEMORY CARD COMMUNICATION CONTROL METHOD, ELECTRONIC DEVICE, AND WIRELESS COMMUNICATION SYSTEM

CROSS REFERENCE TO RELATED APPLICATION

The present invention claims priority to Japanese Patent Application JP 2004-211189, filed in the Japanese Patent Office on Jul. 20, 2004, the entire contents of which being incorporated herein by reference.

BACKGROUND

The present invention relates to a memory card, memory card communication control method, electronic device, and wireless communication system.

There is a memory card that can be inserted into and removed from an electronic device and used to exchange data with the electronic device. The electronic device may be a notebook personal computer, desktop personal computer, or a mobile device such as a digital camera or camera-incorporated cellular phone.

A memory card incorporating a Bluetooth or other wireless communication function, which is a kind of a wireless LAN function, is disclosed, for instance, by Japanese Patent Laid-open No. 2001-77878. The wireless communication function can easily be added to the electronic device by inserting the memory card having the wireless communication function into the electronic device.

However, when the above memory card having the wireless communication function is to be used, it is necessary to use special driver software that controls the wireless communication function of the electronic device. There is no problem if the electronic device is a personal computer or like device on which the driver software can be installed. However, the memory card having the wireless communication function cannot easily be used if the employed electronic device is a digital camera, cellular phone, or like device on which the driver software cannot be installed.

Further, the outside dimensions of the memory card having the wireless communication function are often greater than those of a common memory card because the memory card having the wireless communication function needs to have an adequate space for electronic parts and antenna for implementing the Bluetooth or other wireless communication function.

Since a personal computer can be often used with a memory slot left open, the memory card having the wireless communication function can be used without causing any problem even if it protrudes out of the slot into which it is inserted.

However, mobile devices such as digital cameras and cellular phones have a memory card slot that is to be closed with a cover for memory card protection purposes. Therefore, if the employed memory card having the communication function has greater outside dimensions than a common memory card, the cover cannot be installed over the slot. Consequently, the previously developed memory card having the wireless communication function cannot readily be used with a digital camera, cellular phone, or other mobile device.

SUMMARY

The present invention has been made in view of the above circumstances, and provides a memory card having a wireless communication function, which can be inserted into an electronic device in the same manner as an existing memory card even if driver software cannot be installed on the electronic device; a communication control method for such a memory card; an electronic device into which such a memory card is to be inserted; and a wireless communication system that is provided with such a memory card and electronic device.

According to an embodiment of the present invention, there is provided a memory card, which is provided with a storage section for storing data, mounted in an electronic device to transfer the data between the electronic device and the storage section, and capable of transmitting the data to a data reader. The memory card includes an antenna; an antenna switch that turns on/off to change a load impedance for the antenna; a read section for reading data stored in the storage section; and wireless communication section that causes the read section to read the data in compliance with a data transmission request from the data reader, changes the load impedance for the antenna by exercising on/off control over the antenna switch in accordance with a bit string of the data read by the read section, generates a reflected wave by modulating an unmodulated carrier which is transmitted to the antenna from the outside, and uses the generated reflected wave to transmit the data to the data reader.

According to another embodiment of the present invention, there is provided a communication control method for a memory card that is provided with a storage section for storing data, mounted in an electronic device to transfer the data between the electronic device and the storage section, and capable of transmitting the data to a data reader. The memory card includes an antenna; an antenna switch that turns on/off to change a load impedance for the antenna; a read section for reading data stored in the storage section; and a wireless communication section that exercises on/off control over the antenna switch. The wireless communication section causes the read section to read the data in compliance with a data transmission request from the data reader, changes the load impedance for the antenna by exercising on/off control over the antenna switch in accordance with a bit string of the data read by the read section, generates a reflected wave by modulating an unmodulated carrier which is transmitted to the antenna from the outside, and uses the generated reflected wave to transmit the data to the data reader.

According to a further embodiment of the present invention, there is provided an electronic device into/from which a memory card can be inserted/removed. The memory card, which is provided with a storage section for storing data, mounted in the electronic device to transfer the data between the electronic device and the storage section, and capable of transmitting the data to a data reader, includes: an antenna; an antenna switch that turns on/off to change a load impedance for the antenna; a read section for reading data stored in the storage section; and a wireless communication section that causes the read section to read the data in compliance with a data transmission request from the data reader, changes the load impedance for the antenna by exercising on/off control over the antenna switch in accordance with a bit string of the data read by the read section, generates a reflected wave by modulating an unmodulated carrier which is transmitted to the antenna from the outside, and uses the generated reflected wave to transmit the data to the data reader.

According to a still further embodiment of the present invention, there is provided a wireless communication system including an electronic device; a memory card that can be inserted into and removed from the electronic device; and a data reader. The memory card, which is provided with a storage section for storing data, mounted in the electronic device to transfer the data between the electronic device and the storage section, and capable of transmitting the data to the data reader, includes: an antenna; an antenna switch that turns on/off to change a load impedance for the antenna; a read section for reading data stored in the storage section; and a wireless communication section that causes the read section to read the data in compliance with a data transmission request from the data reader, changes the load impedance for the antenna by exercising on/off control over the antenna switch in accordance with a bit string of the data read by the read section, generates a reflected wave by modulating an unmodulated carrier which is transmitted to the antenna from the outside, and uses the generated reflected wave to transmit the data to the data reader. The data reader includes a data transmission request section for transmitting the data transmission request, a radio wave transmission section for transmitting the unmodulated carrier, and a data read section for receiving a wave reflected from the antenna and reading the data in accordance with the received reflected wave.

According to the present embodiment, the wireless communication section causes the read section to read the data in compliance with a data transmission request from the data reader, changes the load impedance for the antenna by exercising on/off control over the antenna switch in accordance with a bit string of the data read from the storage section by the read section, generates a reflected wave by modulating an unmodulated carrier which is transmitted to the antenna from the outside, and uses the generated reflected wave to transmit the data to the data reader.

Since no function of the electronic device is used to transmit the data from the storage section to the data reader, there is no need to install special driver software that controls the wireless communication function of the electronic device. Consequently, the data can be wirelessly transmitted with the memory card inserted into a digital camera, cellular phone, or other existing electronic device on which the driver software cannot be installed. In other words, the user can exercise a simple image transmission function with the memory card according to an embodiment of the present invention applied to a user's own digital camera or like electronic device.

Further, the antenna switch is subjected to on/off control so that the antenna generates a reflected wave by modulating an unmodulated carrier. The generated reflected wave is then used to transmit the data. It is therefore possible to simplify the structures of the antenna switch and a wireless communication section, and reduce the space required for electronic parts that compose the antenna switch and a wireless communication section. Thus, the case for the memory card according to the present invention can be rendered the same as the case for a common memory card. Consequently, the memory card according to the present invention can be used even when the memory card slot is to be closed by a cover, and installed in the same manner as an existing memory card.

Additional features and advantages of the present invention are described in, and will be apparent from, the following Detailed Description and the figures.

BRIEF DESCRIPTION OF THE FIGURES

FIG. 5 is a sequence diagram illustrating the operation of a wireless communication system according to an embodiment of the present invention.

DETAILED DESCRIPTION

The present invention provides a memory card having a wireless communication function, which can be inserted into an electronic device in the same manner as an existing memory card even if driver software cannot be installed on the electronic device; a communication control method for such a memory card; an electronic device into which such a memory card is to be inserted; and a wireless communication system that uses such a memory card and electronic device. The present invention is implemented by causing a read section to read data in compliance with a data transmission request from a data reader, changing a load impedance for an antenna by exercising on/off control over an antenna switch in accordance with a bit string of data read from a storage section by the read section, generating a reflected wave by modulating an unmodulated carrier, which is transmitted to the antenna from the outside, and using the generated reflected wave to transmit the data to the data reader.

An embodiment of the present invention will now be described with reference to the accompanying drawings.

Figure 1:
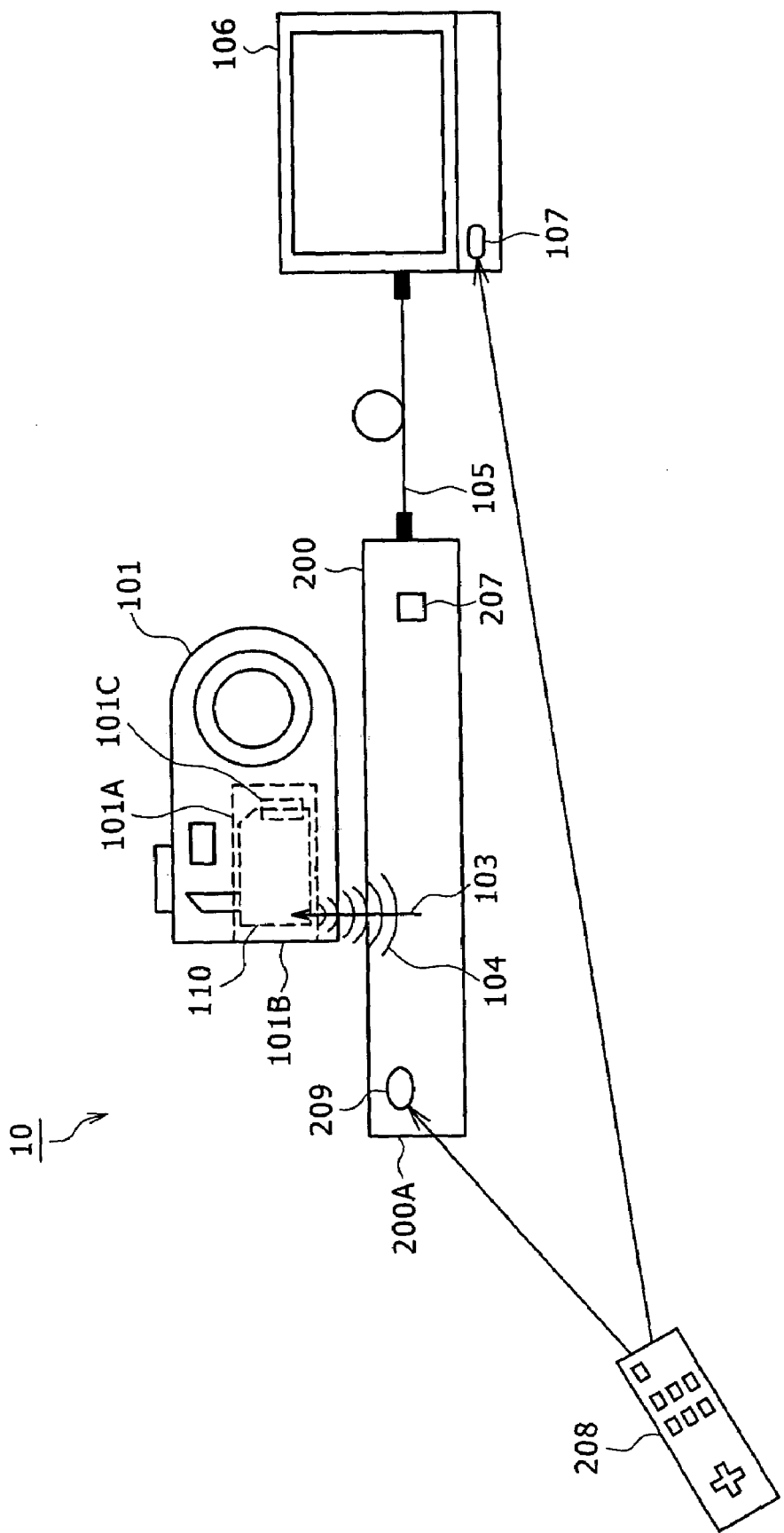
FIG. 1 illustrates the configuration of a wireless communication system according to an embodiment of the present invention.
Figure 2:
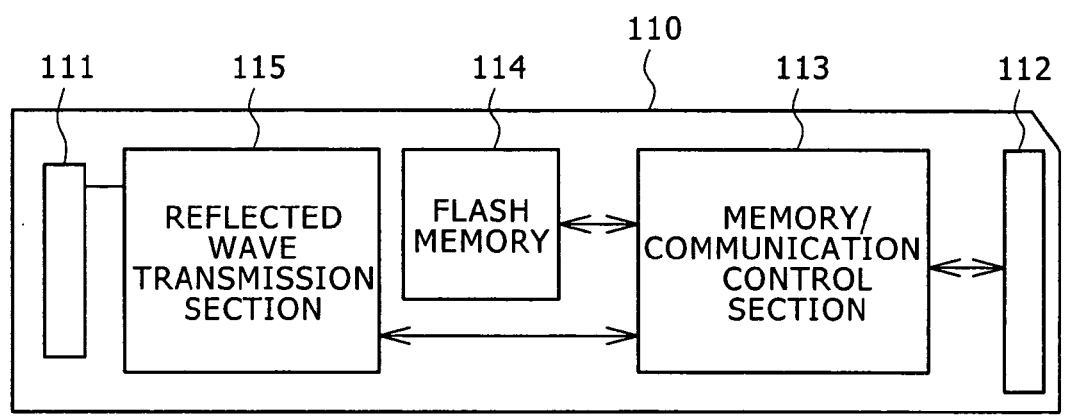
FIG. 2 is a block diagram illustrating the configuration of a memory card.
Figure 3:
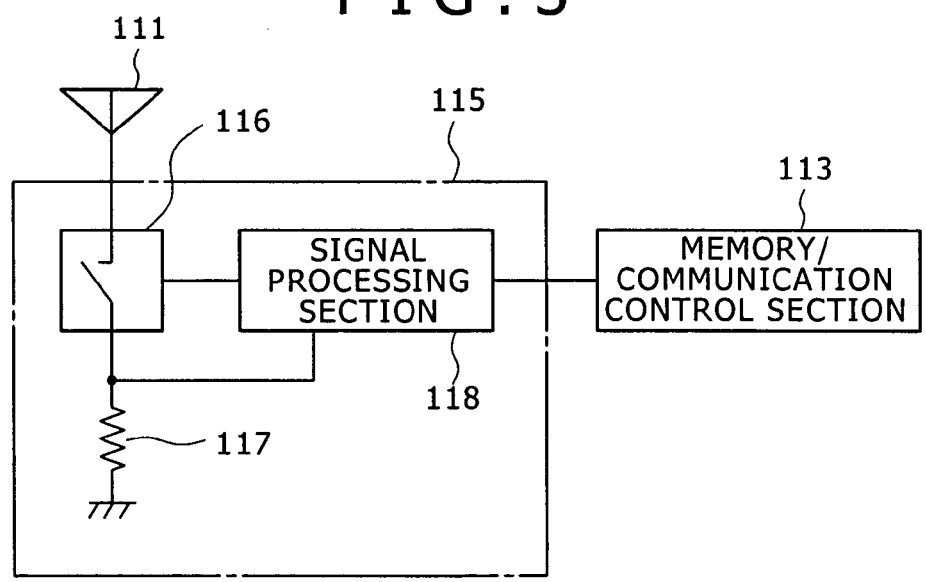
FIG. 3 is a block diagram illustrating a reflected wave transmission section of a memory card.
Figure 4:
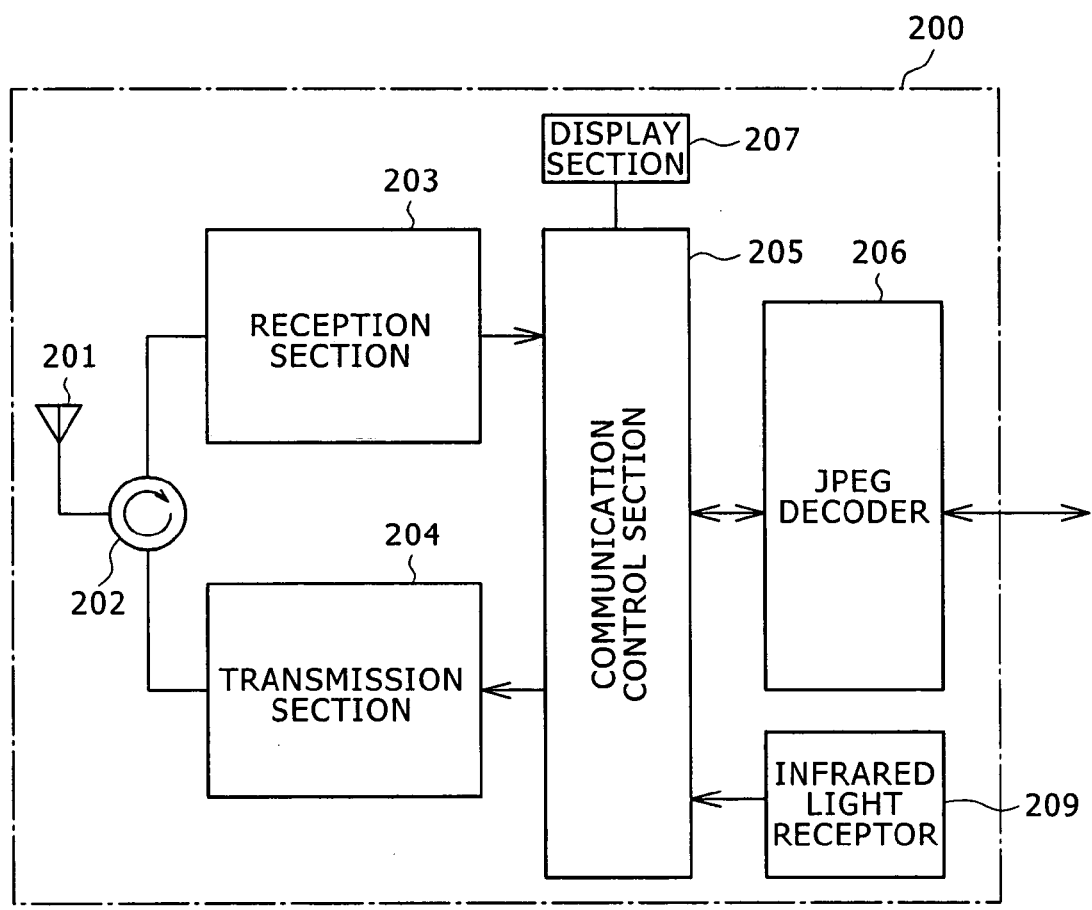
FIG. 4 is a block diagram illustrating the configuration of a data reader.

FIG. 1 illustrates the configuration of a wireless communication system according to the present embodiment. FIG. 2 is a block diagram illustrating the configuration of a memory card. FIG. 3 is a block diagram illustrating the configuration of a memory card's reflected wave transmission section. FIG. 4 is a block diagram illustrating the configuration of a data reader. FIG. 5 is a sequence diagram illustrating the operation of the wireless communication system according to the present embodiment.

As shown in FIG. 1, the wireless communication system 10 includes an electronic device 101, a memory card 110, a data reader 200, and a TV 106.

In the present embodiment, the electronic device 101 is a digital still camera. It includes a memory card slot 101A from/into which a common memory card can be inserted/removed, a cover 101B for opening/closing the memory card slot 101A, and an electronic device side connector 101C for connecting to a memory card side connector on the memory card that is inserted into the memory card slot 101A.

The electronic device 101 can transfer data including image data to a common memory card in the memory card slot 101A via the electronic device side connector 101C and memory card side connector.

As shown in FIG. 2, the memory card 110 has a case (not shown). The case houses a flash memory 114, which is a storage section, a memory card side connector 112, a memory/communication control section 113, a reflected wave transmission section 115, an antenna 111, and the like. The contact of the memory card side connector 112 is exposed out of the case.

The flash memory 114 stores data in such a manner that the data can be rewritten. The memory card side connector 112 is connectable to the electronic device side connector 101C as is the case with a common memory card. The memory/communication control section 113 transfers data between the electronic device 101 and flash memory 114 via the electronic device side connector 101C and memory card side connector 112. Further, the memory/communication control section 113 wirelessly transmits the data in the flash memory 114 to the data reader 102 via the reflected wave transmission section 115 and antenna 111.

In the present embodiment, the image data picked up by the electronic device 101 is stored after being transferred from the memory/communication control section 113 to the flash memory 114 in the memory card 110 via the electronic device side connector 101C and memory card side connector 112. In other words, the flash memory 114 stores one or more image data, that is, one or more files. The flash memory 114 also stores a file configuration that indicates what files are stored in the flash memory 114.

As shown in FIG. 3, the reflected wave transmission section 115 includes an antenna switch 116, an antenna load 117, and a signal processing section 118.

The antenna switch 116 is connected between the antenna 111 and antenna load 117, and turned on/off by the signal processing section 118 to terminate or open the antenna 111. In the present embodiment, the antenna switch 116 is a high-frequency switch that includes, for instance, a gallium arsenide IC, and consumes no more than several tens of microwatts of power.

One end of the antenna load 117 is connected to the antenna switch 116 while the other end is shorted to ground. Therefore, the antenna load 117 terminates the antenna 111 when the antenna switch 116 turns on.

Upon receipt of a bit string of the data read from the flash memory 114 by the memory/communication control section 113, the signal processing section 118 exercises on/off control over the antenna switch 116 in accordance with the bit string to terminate or open the antenna 111. In other words, the signal processing section 118 varies the load impedance of the antenna 111.

If the antenna 111 is terminated or opened when an unmodulated carrier 103 (radio wave) is transmitted from the data reader 102, the antenna 111 transmits a reflected wave 104 (see FIG. 1) that is modulated when the unmodulated carrier 103 is absorbed or reflected by the antenna 111. In other words, the antenna 111 transmits a modulated wave. This communication method is called a "backscatter method."

As a wave modulation method, for example, amplitude shift keying (ASK), phase shift keying (PSK), or quadrature phase shift keying (QPSK) may be adopted. The present embodiment uses the ASK method.

In the present embodiment, the signal processing section 118 has a reception function for receiving via the antenna 111 a transmission request signal (data transmission request) that is modulated by a predetermined modulation method and transmitted from the data reader 102. The signal processing section 118 demodulates the transmission request signal in accordance with the predetermined modulation method and supplies the resulting demodulated signal to the memory/communication control section 113. The transmission request signal (data transmission request) requests the transmission of at least either the files stored in the flash memory 114 or the configuration of the stored files.

For transmission request signal modulation, the ASK, PSK, QPSK, or other similar method may be used.

In compliance with the transmission request signal supplied from the signal processing section 118, the memory/communication control section 113 reads data in the flash memory 114 and supplies the read data to the reflected wave transmission section 115.

While the memory/communication control section 113 transfers data between the flash memory 114 and electronic device 101, the signal processing section 118 is prohibited from transmitting a reflected wave 104 (transmitting the data). While the signal processing section 118 transmits a reflected wave 104 (transmits the data), the memory/communication control section 113 is prohibited from transferring data between the flash memory 114 and electronic device 101.

In the present embodiment, the electronic device side connector 101C and memory card side connector 112 constitute a connector that is defined by the appended claims; the memory/communication control section 113 constitutes wired communication means and read means that are defined by the appended claims; and the signal processing section 118 constitutes wireless communication means that is defined by the appended claims.

As shown in FIG. 1, the data reader 200 includes a housing 200A. The outer surface of the housing 200A is provided with an infrared light receptor 209, which receives an infrared control signal from an infrared remote controller 108, and a display section 207, which, for instance, illuminates to indicate that data is being received from the memory card 110. The display section 120 is furnished to prevent the user from inadvertently operating the electronic device 101 during data reception.

Further, the data reader 200 is connected to an image input terminal of the TV 106 via a signal line 105. The data reader supplies image data to the TV 106 via the signal line 105.

As shown in FIG. 4, the housing 200A contains an antenna 201, a circulator 202, a reception section 203, a transmission section 204, a communication control section 205, and a JPEG decoder 206.

In the present embodiment, the antenna 201 is a 2.4 GHz band antenna. In accordance with an unmodulated carrier transmission signal supplied from the transmission section 204, the antenna 201 generates an unmodulated carrier 103, allows it to pass through the housing 200A, and transmits it out of the housing 200A.

In compliance with unmodulated carrier transmission instructions from the communication control section 205, the transmission section 204 generates the unmodulated carrier transmission signal and supplies it to the antenna 201 via the circulator 202.

The reception section 203 receives the reflected wave 104, which is received by the antenna 201, via the circulator 202, and supplies the received signal to the communication control section 205.

The communication control section 205 receives a control signal, which is transmitted from the infrared remote controller 108, via the infrared light receptor 209, and issues the unmodulated carrier transmission instructions to the transmission section 204 in compliance with a command for the start of unmodulated carrier transmission, which is indicated by the received control signal. Further, the communication control section 205 generates data by demodulating the reflected wave 104, which is received from the reception section 203, and supplies the generated data to the JPEG decoder 206. Furthermore, while the data is being demodulated with the reflected wave 104 received by the reception section 203, the communication control section 205 causes the display section 207 to indicate that data reception is in progress, thereby urging the user to refrain from operating the electronic device 101. In the present embodiment, the communication control section 205 transmits the transmission request signal via the transmission section 304, circulator 202, and antenna 201.

The JPEG decoder 206 receives the supplied data, generates an analog video signal (e.g., NTSC signal) from JPEG data, and supplies the analog video signal as an image signal to the TV 106 via the signal line 105.

In the present embodiment, the antenna 201, circulator 202, transmission section 204, and communication control section 205 constitute data transmission request means and radio wave transmission means that are defined by the appended claims; the antenna 201, circulator 202, reception section 203, and communication control section 205 constitute data read means that is defined by the appended claims; and the JPEG decoder 206 constitutes data transfer means that is defined by the appended claims.

The TV 106 displays an image in accordance with the image signal that is supplied through the signal line 105. In the present embodiment, the TV 106 is provided with an infrared light receptor 107, which receives an infrared control signal from the infrared remote controller 108. Therefore, the TV 106 can be remote controlled in accordance with the control signal transmitted from the infrared remote controller 108.

The operation performed by the wireless communication system according to the present embodiment will now be described with reference to FIG. 5.

First of all, the electronic device 101 into which the memory card 110 is inserted is placed on the upper surface of the housing 200A for the data reader 200 in such a manner that the distance between the antenna 111 for the memory card 110 and the antenna 201 for the data reader 200 is several centimeters.

The user operates the infrared remote controller 108 to send a video changeover signal 301 to the TV 106 as the aforementioned control signal. In accordance with the video changeover signal 301 received via the infrared light receptor 107, the TV 106 enters an external video input mode.

Subsequently, the user operates the infrared remote controller 108 to send a display request signal 302 to the data reader 200 as the aforementioned control signal. The data reader 200 transmits a transmission request signal 303 based, for instance, on ASK to the memory card 110, and then transmits an unmodulated carrier 103.

Upon receipt of the transmission request signal 303, the memory/communication control section 113 of the memory card 110 invokes a transfer prohibited state 307 in which the memory/communication control section 113 prohibits a data transfer operation from being performed between the flash memory 114 and electronic device 101, and then transmits the data (image data) in the flash memory 114 to the data reader 200 as a reflected wave 104.

The data reader 200 receives and demodulates the image data 304, which is transmitted as a reflected wave 104, causes the JPEG decoder 206 to perform a JPEG decoding operation 305, and outputs the resultant converted analog video signal 306 to the TV 106. The TV 106 then displays an image.

The analog video signal 306, which is output to the TV 106 from the data reader 200, may be an image or a set of a plurality of images. Further, the data reader 200 may be provided with image processing functions such as an enlargement function, reduction function, and rotation function, and the infrared remote controller 108 may be operated to cause the data reader 200 to output variously processed image data to the TV 106 as the analog video signal 306. Furthermore, the display request signal 302 may incorporate the function of the video changeover signal 301 to omit the transmission of the video changeover signal 301.

The present embodiment assumes that only the image data 304 is transmitted. Alternatively, however, both the files (image data) and the configuration of the files, which are stored in the flash memory 114, or only the configuration of the files may be transmitted depending on the contents of the transmission request signal (data transmission request).

In the present embodiment, the memory/communication control section 113 reads data from the flash memory 114 in compliance with a data transmission request from the data reader 200. The signal processing section 118 exercises on/off control over the antenna switch 116 in accordance with the bit string of the data that is read from the flash memory 114 by the memory/communication control section 113. Consequently, the unmodulated carrier 103, which is transmitted from the data reader 200 to the antenna 111, is absorbed or reflected by the antenna 111 in accordance with the bit string of the data. The reflected wave 104, which is obtained by modulating the unmodulated carrier 103, is then generated. The obtained reflected wave 104 is used to transmit the data to the data reader 200.

Thus, the functions of the electronic device 110 are not used to transmit the data, which is stored in the flash memory 114, to the data reader 200. Therefore, it is not necessary to install special driver software that controls the wireless communication function of the electronic device. The data can be wirelessly transmitted with the memory card 110 inserted into a digital camera, cellular phone, and other existing electronic device on which the driver software cannot be installed.

The reflected wave 104, which is obtained when the antenna 111 modulates the unmodulated carrier 103, is generated by exercising on/off control over the antenna switch 116. The generated reflected wave 104 is used for data transmission. Therefore, the configurations of the antenna switch 116 and signal processing section 118 can be simplified. In addition, it is possible to reduce the space required for electronic parts that compose the antenna switch 116 and signal processing section 118 within the case of the memory card 110. Thus, the case for the memory card 110 can be shaped the same as the case for a common memory card. Consequently, the memory card 110 can be used even when the memory card slot is to be closed by a cover, and inserted into an electronic device in the same manner as an existing memory card.

If the memory card slot is closed by a cover with a memory card having a Bluetooth or other conventional wireless communication function inserted into the memory card slot in a situation where the enclosure of the electronic device is made of a metal material or a metal-plated synthetic resin material, the radio wave is significantly attenuated by the enclosure including the cover. Such attenuation makes it difficult to achieve a specified wireless communication speed.

In the present embodiment, however, on/off control is exercised over the antenna switch 116 to generate the reflected wave 104, which is obtained when the antenna 111 modulates the unmodulated carrier 103. The generated reflected wave 104 is then used to transmit data in a noncontact manner. Therefore, even if the radio wave is significantly attenuated as described above, it is possible to provide an adequate wireless link margin. If the frequency of the unmodulated carrier 103 is within a 2.4 GHz band, the resulting data communication speed is approximately 10 times the Bluetooth communication speed or equivalent to a wireless LAN communication speed. Thus, the present embodiment has the advantage that it achieves a specified wireless communication speed.

Further, in the present embodiment, the data reader 200 and an external device such as the TV 106 can be controlled with the same infrared remote controller 108. The data in the memory card 110, which is inserted into the electronic device 101, can be easily transmitted to the external device by operating the infrared remote controller 108 at a remote location. Thus, the present embodiment has the advantage that it offers increased ease of operation.

The present embodiment assumes that a digital still camera is used as the electronic device 101. However, a mobile device such as a digital video camera, cellular phone, PDA and a non-mobile electronic device may be used alternatively.

While a preferred embodiment of the present invention has been described using specific terms, such description is for illustrative purpose only, and it is to be understood that changes and variations may be made without departing from the spirit or scope of the following claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A memory card that includes storage means for storing data, operable to be mounted in an electronic device to transfer the data between the electronic device and the storage means, and capable of transmitting the data to a data reader, the memory card comprising:
   an antenna;
   an antenna switch that turns on/off to change a load impedance for the antenna;
   read means for reading data stored in the storage means; and
   wireless communication means that causes the read means to read the data in compliance with a data transmission request from the data reader, changes the load impedance for the antenna by exercising on/off control over the antenna switch in accordance with a bit string of the data read by the read means, generates a reflected wave by modulating an unmodulated carrier which is transmitted to the antenna from the outside, and uses the generated reflected wave to transmit the data to the data reader wired communication means that transfers data between the electronic device and the storage means, wherein the wireless communication means is prohibited from transmitting the data while the data is transferred by the wired communication means; and wherein the wired communication means is prohibited from transferring the data while the wireless communication means transmits the data.

2. The memory card according to claim 1, wherein the data includes one or more files; and wherein the data transmission request requests the transmission of at least the files and the configuration of the files.

3. The memory card according to claim 1, wherein the data transmission request is a radio signal that is transmitted from the data reader to the antenna.

4. The memory card according to claim 1, wherein the wired communication means is connected to the electronic device via a connector.

5. The memory card according to claim 4, wherein the connector comprises a memory card side connector, which is mounted on the memory card, and an electronic device side connector, which is mounted on the electronic device to mate with the memory card side connector.

6. The memory card according to claim 1, further comprising a case, wherein the antenna is housed in the case.

7. A communication control method for a memory card that includes storage means for storing data, operable to be mounted in an electronic device to transfer the data between the electronic device and the storage means, and capable of transmitting the data to a data reader, the memory card comprising:
   an antenna;
   an antenna switch that turns on/off to change a load impedance for the antenna;
   read means for reading data stored in the storage means; and
   wireless communication means that exercises on/off control over the antenna switch, wherein the wireless communication means causes the read means to read the data in compliance with a data transmission request from the data reader, changes the load impedance for the antenna by exercising on/off control over the antenna switch in accordance with a bit string of the data read by the read means, generates a reflected wave by modulating an unmodulated carrier which is transmitted to the antenna from the outside, and uses the generated reflected wave to transmit the data to the data reader, wherein the memory card includes wired communication means that transfers the data between the electronic device and the storage means; wherein the wireless communication means is prohibited from transmitting the data while the data is transferred by the wired communication means; and wherein the wired communication means is prohibited from transferring the data while the wireless communication means transmits the data.

8. The communication control method for a memory card according to claim 7, wherein the data includes one or more files; and wherein the data transmission request requests the transmission of at least either the files or the configuration of the files.

9. The communication control method for a memory card according to claim 7, wherein the data transmission request is a radio signal that is transmitted from the data reader to the antenna.

10. An electronic device into/from which a memory card can be inserted/removed, wherein the memory card, which includes storage means for storing data, operable to be mounted in the electronic device to transfer the data between the electronic device and the storage means, and capable of transmitting the data to a data reader, comprises:
   an antenna;
   an antenna switch that turns on/off to change a load impedance for the antenna;
   read means for reading data stored in the storage means; and
   wireless communication means that causes the read means to read the data in compliance with a data transmission request from the data reader, changes the load impedance for the antenna by exercising on/off control over the antenna switch in accordance with a bit string of the data read by the read means, generates a reflected wave by modulating an unmodulated carrier which is transmitted to the antenna from the outside, and uses the generated reflected wave to transmit the data to the data reader, wherein the memory card includes wired communication means for transferring the data between the electronic device and the storage means; and wherein the wireless communication means is prohibited from transmitting the data while the data is transferred by the wired communication means; and wherein the wired communication means is prohibited from transferring the data while the wireless communication means transmits the data.

11. The electronic device according to claim 10, wherein the data includes one or more files; and wherein the data transmission request requests the transmission of at least either the files or the configuration of the files.

12. The electronic device according to claim 10, wherein the data transmission request is a radio signal that is transmitted from the data reader to the antenna.

13. A wireless communication system comprising:
an electronic device;
a memory card that can be inserted into and removed from the electronic device; and
a data reader,
wherein the memory card, which includes storage means for storing data, operable to be mounted in the electronic device to transfer the data between the electronic device and the storage means, and capable of transmitting the data to the data reader, comprises:
an antenna;
an antenna switch that turns on/off to change a load impedance for the antenna;
read means for reading data stored in the storage means; and
wireless communication means that causes the read means to read the data in compliance with a data transmission request from the data reader, changes the load impedance for the antenna by exercising on/off control over the antenna switch in accordance with a bit string of the data read by the read means, generates a reflected wave by modulating an unmodulated carrier which is transmitted to the antenna from the outside, and uses the generated reflected wave to transmit the data to the data reader; and
wherein the data reader includes data transmission request means for transmitting the data transmission request, radio wave transmission means for transmitting the unmodulated carrier, and data read means for receiving a wave reflected from the antenna and reading the data in accordance with the received reflected wave, wherein the memory card is configured so that the wireless communication means is prohibited from transmitting the data while the data is transferred by the wired communication means, and that the wired communication means is prohibited from transferring the data while the wireless communication means transmits the data.

14. The communication control method for the memory card according to claim 13, wherein the data includes one or more files; and wherein the data transmission request requests the transmission of at least either the files or the configuration of the files.

15. The wireless communication system according to claim 13, wherein the data transmission request is a radio signal that is transmitted from the data reader to the antenna.

16. The wireless communication system according to claim 13, wherein the data reader includes data transfer means for transferring the data, which is read by the data read means, to an external device other than the electronic device.

17. The wireless communication system according to claim 13, wherein the data reader includes a display section, which, while the data is being received by the data read means, indicates that the data is being received.

18. A wireless communication system comprising:
an electronic device;
a memory card that can be inserted into and removed from the electronic device; and
a data reader,
wherein the memory card, which includes storage means for storing data, operable to be mounted in the electronic device to transfer the data between the electronic device and the storage means, and capable of transmitting the data to the data reader, comprises:
an antenna
an antenna switch that turns on/off to change a load impedance for the antenna;
read means for reading data stored in the storage means; and
wireless communication means that causes the read means to read the data in compliance with a data transmission request from the data reader, changes the load impedance for the antenna by exercising on/off control over the antenna switch in accordance with a bit string of the data read by the read means, generates a reflected wave by modulating an unmodulated carrier which is transmitted to the antenna from the outside, and uses the generated reflected wave to transmit the data to the data reader;
wherein the data reader includes data transmission request means for transmitting the data transmission request, radio wave transmission means for transmitting the unmodulated carrier, and data read means for receiving a wave reflected from the antenna and reading the data in accordance with the received reflected wave, wherein the memory card includes wired communication means for transferring the data between the electronic device and the storage means, and
wherein the wireless communication means is prohibited from transmitting the data while the data is transferred by the wired communication means; and wherein the wired communication means is prohibited from transferring the data while the wireless communication means transmits the data.

* * * * *